United States Patent
Amiocangioli et al.

(10) Patent No.: US 7,376,078 B1
(45) Date of Patent: May 20, 2008

(54) SELECTIVE REPLAY OF A STATE INFORMATION WITHIN A COMPUTING DEVICE

(75) Inventors: Anthony D. Amiocangioli, Greenwich, CT (US); Robert M. France, Carlisle, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 836 days.

(21) Appl. No.: 10/807,823

(22) Filed: Mar. 24, 2004

(51) Int. Cl.
    *H04J 3/14* (2006.01)
(52) U.S. Cl. ............................ 370/217; 370/221
(58) Field of Classification Search ................ 370/329, 370/392, 220; 714/4, 13, 11
    See application file for complete search history.

(56) References Cited

U.S. PATENT DOCUMENTS

| 6,327,243 | B1 | 12/2001 | Gregorat | |
|---|---|---|---|---|
| 6,421,741 | B1 | 7/2002 | Minyard | |
| 6,628,649 | B1 | 9/2003 | Raj et al. | |
| 6,968,401 | B2 | 11/2005 | McBrearty et al. | |
| 6,999,411 | B1 * | 2/2006 | Brewer et al. | 370/220 |
| 7,234,001 | B2 * | 6/2007 | Simpson et al. | 709/239 |
| 2002/0067704 | A1 * | 6/2002 | Ton | 370/329 |
| 2002/0169794 | A1 * | 11/2002 | Jones et al. | 707/204 |
| 2003/0046604 | A1 * | 3/2003 | Lau et al. | 714/11 |
| 2004/0078619 | A1 * | 4/2004 | Vasavada | 714/4 |
| 2004/0078625 | A1 * | 4/2004 | Rampuria et al. | 714/4 |
| 2004/0083403 | A1 * | 4/2004 | Khosravi | 714/13 |
| 2005/0021844 | A1 * | 1/2005 | Puon et al. | 709/238 |
| 2005/0060427 | A1 * | 3/2005 | Phillips et al. | 709/238 |
| 2005/0193229 | A1 * | 9/2005 | Garg et al. | 714/4 |
| 2005/0281191 | A1 | 12/2005 | McGee et al. | |
| 2005/0283529 | A1 | 12/2005 | Hsu et al. | |
| 2006/0092940 | A1 * | 5/2006 | Ansari et al. | 370/392 |
| 2006/0256767 | A1 | 11/2006 | Suzuki et al. | |

OTHER PUBLICATIONS

U.S. Patent Application entitled "Routing Protocol Failover Between Control Units Within a Network Router," U.S. Appl. No. 11/029,271, filed Jan. 5, 2005.

* cited by examiner

*Primary Examiner*—Melvin Marcelo
*Assistant Examiner*—Abdullah Riyami
(74) *Attorney, Agent, or Firm*—Shumaker & Sieffert, P.A.

(57) ABSTRACT

A router synchronizes state information between a plurality of control units. The router includes a primary control unit and a standby control unit. To ensure proper operation of the router, the primary control unit maintains router resources by receiving state information from the router resources and maintaining the state information for consumers. The primary control unit performs this maintenance process by transmitting update operation messages to consumers and the standby control unit. The consumers respond with an acknowledgement message to both the primary control unit and the standby control unit. The control units use the sequence of these messages to keep all components within the router in sync. Upon assuming control, the standby control unit resumes updating the consumers with state information without having to "relearn" state information, e.g., by way of power cycling the router resources to a known state.

24 Claims, 6 Drawing Sheets

SELECTIVE REPLAY OF A STATE INFORMATION WITHIN A COMPUTING DEVICE

TECHNICAL FIELD

The invention relates to computing environments and, more particularly, to managing state information within a computing environment.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, maintain tables of information that describe routes through the network. A "route" can generally be defined as a path between two locations on the network. Upon receiving an incoming data packet, the router examines destination information within the packet to identify the destination for the packet. Based on the destination, the router forwards the packet in accordance with the routing table.

The physical connection between devices within the network is generally referred to as a link. A router uses interface cards (IFCs) for receiving and sending data packets via network links. These IFCs are installed in physical slots within the router that contain physical connections known as ports. Interfaces are configured within the IFCs using interface configurations. These IFCs are sometimes referred to as interface components as the IFCs may be implemented as more than one physical card.

Generally, a router maintains state information. For example, a router may maintain state information representing the current state of the interfaces between the router and the network. Such state information may include information representing the state of one or more IFCs, such as the current configuration of the IFCs. As additional examples, a router may maintain state information representing the state of one or more forwarding engines, one or more routing engines, or other resources within the router.

In particular, a process operating within a router may maintain the state information and communicate changes to the state information to various other processes or components within the router. These other processes or components are sometimes referred to as "consumers," because they receive and utilize the state information maintained by a first process. These consumers make use of the state information when performing their various functions.

As the complexity of conventional networks has increased in recent years, management of the state information within a router or other network device has likewise become a significant challenge. Some existing methods for managing state information involve caching the information within the operating system, and issuing state change notification messages to software modules executing within the router. In response, the software modules retrieve the state information from the operating system.

These conventional methods may be adequate if the rate of state change is relatively low. When the rate of state change increases, however, the rate of generation of state change messages may exceed the capacity of the consumers to receive and process the state information. In addition, the generation of state change messages may exceed the capacity of the communication channel between consumers to carry messages, and may exceed the capacity of the sender to store messages.

To further compound the problem, routers are increasing in complexity. For example, some conventional routers may include a primary control unit and one or more standby control units, all of which may require state information. In the event that the primary control unit fails, one of the standby control units assumes control of the routing resources to continue operation of the router. The process of switching control of routing functions between the primary and standby control units is often referred to as failover. State information managed by processes executing on the primary control unit may be required by the standby control unit to assume control and continue operation of the router resources. However, once the primary control unit fails, some or all of the state information managed by processes executing on the primary control unit may be lost. In some instances, to assume proper control and ensure operation, the standby control unit is forced to "relearn" the lost state information from each resource, e.g., by power cycling the router resources to a known state.

As part of any failover recovery process in which control units and interface cards attempt to re-synchronize state information for each process within the router, a standby control unit identifies any processes running within the control unit that possesses state information that differs from the corresponding state information present within the interface cards. These two sets of state information typically are identical in that a primary control unit sends changes to both the interface cards as well as the standby control units. If the state information changes have been implemented in both the interface cards and the standby control unit prior to a failover, the standby control unit may begin operation in place of the primary control unit without any problems. If the state information changes have not been implemented on both units, or more correctly, if the changes have been implemented on one unit but not another unit at the time of the failover, the state information is out-of sync for this particular control unit/interface card pair.

Various methods for preventing or correcting this out-of sync condition have been implemented in the past. Many of these methods include halting all operations between the control units and the interface cards until the change to the state information has occurred. As such, the control units may ensure that all updates, except for possibly an in-process state change operation, have been implemented. These approaches typically place an emphasis on keeping the various units in sync, and thus minimizing the amount of relearning that needs to occur. However, these approaches impose a significant cost upon the operation of the control units. When a state information change is to occur, the above approaches require that all other operations within a process wait for the update to occur. If a particular interface component is busy processing state related operations for different processes, many processes that may be related to other interface component that are not currently busy may be paused until the pending update occurs. This situation typically gives rise to many processes within control units and numerous interface components to operate less efficiently than is desired.

Other approaches to solving the re-synchronization/re-learning problem have attempted to include enough data within the requests sent to both standby control units and interface components that a standby control unit may determine the lost data from uncompleted state information update operations from the data found in either the standby control unit and/or the interface components. If the control units possess the state change information while the interface components do not, the control units may use the data to resend the required information to the interface units to replace the lost data. If the control units do not possess the state change information while the interface units do, the control units may request the lost state change data be transmitted from the interface components to the control units to again replace the lost data.

This additional approach again attempts to maximize the possible recovery of lost state information change data. However, this additional approach imposes a significant cost to the operation of the various units in several ways. First, this additional approach requires that the state information change data that is sent to every unit involved in the update operation include all of the data needed to update every other unit involved in the process. Typically, interface components do not need all of the information maintained by the control units as it may relate to user interface and display operations of the system that may not be related to the operation of the interface components. As such, requiring the transmission and maintenance of this additional data imposes requirements on each control unit and interface component in the system to possess additional data storage to maintain the data as well as imposes requirements on the data communication resources used to send data between the control units and interface components.

SUMMARY

In general, the invention is directed to techniques for synchronizing state information within a computing device having multiple control units, e.g., a primary control unit and at least one standby control unit. For purposes of example, the principles of the invention are described in reference to a network router. The invention, however, is not so limited and may be applied to other devices.

In accordance with the principles of the invention, the router includes a primary control unit and at least one standby control unit, both of which execute respective operating systems. Each of the operating systems manages respective state information within internal data structures. In particular, each of the operating systems may support execution of kernel-mode processes, which manage the respective state information. As data associated with state information in the primary control unit is modified, the primary operating system, working together with various software processes within components of the router, communicate the modifications. As such, the standby control unit modifies its copy of the state information to stay synchronized with the corresponding state information within the primary control unit. Consequently, the standby control unit is able to readily assume responsibility in the event of a failover, and can continue updating the consumers with the state information as necessary. In this manner, the standby control unit may assume control of router resources without needing to "relearn" state information, e.g., by power cycling the router resources to a known state.

During normal operation, in the event the state information changes, various individual processes, in cooperation with the primary operating system of the router, synchronize state information with various processes executing on the one or more standby control units (referred to herein as "standby processes") of the router. At approximately the same time as the update messages are sent to the standby processes, corresponding update messages are sent to the consumers for use in updating the state information of these consumers. In this particular embodiment, these consumers typically correspond to client processes executing on interface components to control the operation of data packet forwarding operations of the interface units. The update messages sent to these interface units may represent a subset of the state information data maintained by the primary process that is also transmitted to the standby process.

The client processes on the interface components receive and process the state update messages before generating and transmitting an acknowledgement message to the primary process. This acknowledgement message indicates that the respective state update operation has been completed within the client process on the interface unit. The acknowledgement message is subsequently forwarded from the primary processes to the standby processes.

Upon receiving both the state changes message and the corresponding acknowledgement message, the standby process updates its state information to successfully synchronize the state information between the primary process, the corresponding client process and itself. In this manner, the router maintains sufficient information to permit the orderly update of state information between the various components within the router 6A.

Because the state information is maintained as described above, one of the standby control units may assume control of the router, and can deterministically identify the state information of which each consumer has already been informed, i.e., consumed. As a result, the standby control units may need only update the consumers with limited amount of state information, and need not rely on relearning state information from the resources of router 6A.

In one embodiment, a method comprises updating state information data within a primary control unit in response to a state change, and generating a unique state change identifier in response to the state change and communicating a first update message from the primary control unit to an interface component and a second update message to a standby control unit, wherein the first and second update messages each include the unique state change identifier.

In another embodiment, a method comprises storing state change update messages and corresponding acknowledgement messages in a standby control unit. Each of the update messages and the respective one of the acknowledgement messages include a corresponding state change identifier and upon an occurrence of a failover event. The method further comprises selectively replaying state information to an interface component from the standby control unit based upon the state change identifiers of the stored update messages and acknowledgement messages.

In another embodiment, a method comprises communicating a first state data update message from a primary control unit to an interface component and a second state data update message to a standby control unit to update state information within the interface component and the standby control unit, the first and second state data update messages having a common unique operation ID, and communicating an acknowledgement message from the consumer unit to the standby control unit to indicate the successful processing of the first state data update message, the acknowledgement message having the unique operation ID. The method further comprises, upon receipt of both the second update message and the acknowledgement message, processing the second update message in the standby control unit and upon an occurrence of a failover event, the standby control unit selectively replaying state information to the consumer unit when the second operation message was received without its corresponding acknowledgement message.

In another embodiment, a system comprises an interface component, a standby control unit, and a primary control unit that manages state information, wherein the primary control unit asynchronously communicates changes to the state information to both the standby control unit and the interface component.

In another embodiment, a system comprises a primary control unit that manages state information data corresponding to primary processes, standby processes and client processes, and a standby control unit for assuming responsibility for managing the state information data upon the occurrence of a failover event; and an interface component. The primary control unit communicates changes to state information data for each primary process to both the standby control unit and the interface component using an state data update message and the interface component transmits an acknowledgement message to the standby control unit following the successful processing of the state data update message.

In another embodiment, a system comprises a means for communicating a first state data update message from a primary control unit to an interface component and a second state data update message to a standby control unit, the first and second state data update messages having a unique operation ID, a means for communicating an acknowledgement message from the interface component to the standby control unit to indicate the successful processing of the first update message, the acknowledgement message having the unique operation ID, a means for processing the second update message upon receipt of both the second update message and the acknowledgement message having identical unique operation ID and a means for selectively replaying state information to the interface component when the second update message was received without its corresponding acknowledgement message upon an occurrence of a failover event. The standby control unit stores the second update messages and the acknowledgement messages in a pending message queue.

In another embodiment, a computer-readable medium comprises encoded instructions for causing a primary control unit to communicate a first state data update message from a primary control unit to an interface component and a second state data update message to a standby control unit, the first and second state data update messages having a common unique operation ID, communicate an acknowledgement message from the interface component to the standby control unit to indicate the successful processing of the first update message, the operation message having the common unique operation ID, upon receipt of both the second state data update message and the acknowledgement message having common identical unique operation ID, process the second state data update message within the standby control unit and upon an occurrence of a failover event, the standby control unit selectively replay state information to the interface component when the second update message was received without its corresponding acknowledgement message.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
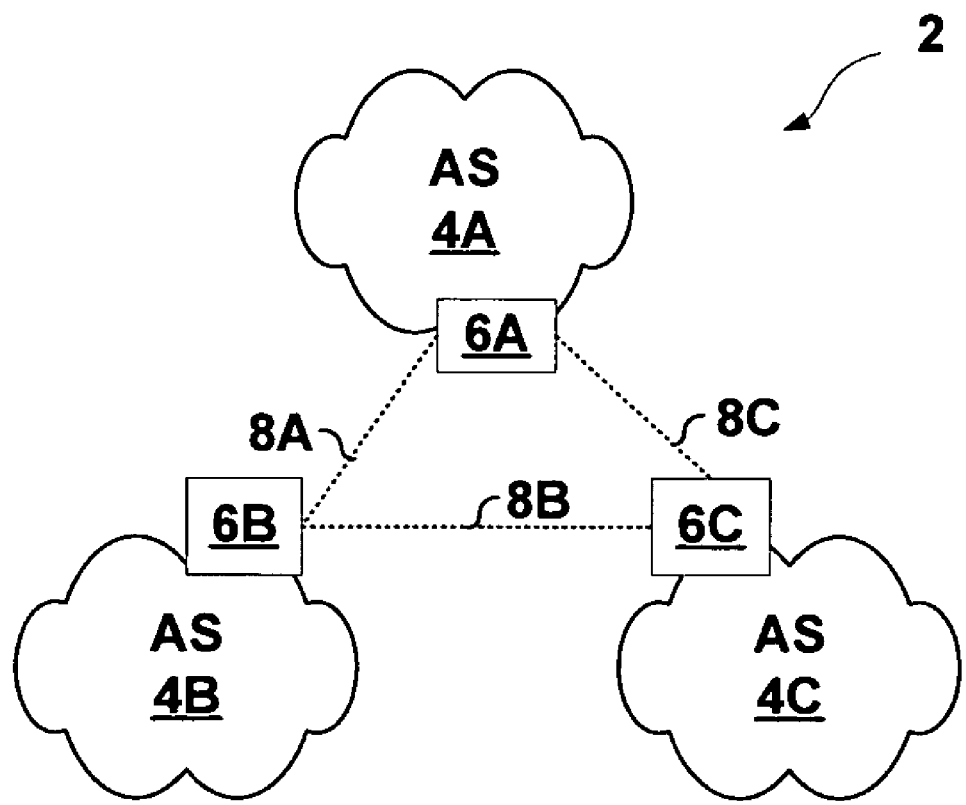
FIG. 1 illustrates a group of autonomous systems (AS) forming a computer network.

FIG. 1 illustrates an exemplary computing network 2 formed by autonomous systems 4A-4C (herein "autonomous systems 4") interconnected via communication links 8A-8C (hereinafter referred to as "links 8"). Each of autonomous systems 4 represents an administrative domain having a variety of networked resources capable of packet-based communication. For example, autonomous systems 4 may include servers, workstations, network printers and faxes, gateways, routers, and the like. Autonomous systems 4 include routers 6 for sharing routing information and forwarding packets via communication links 8.

Router 6A provides for failover by including a primary control unit as well as one or more standby control units. In the event the primary control unit fails, one of the standby control units assumes control over routing resources and routing functionality generally. Prior to failure, the primary and standby control units synchronize their respective state information to allow the standby control unit to assume control of the router resources without having to relearn state information. For exemplary purposes, the principles of the invention will be described in reference to router 6A. However, any or all of routers 6B-6C may operate in accordance with the techniques described herein.

Router 6A may manage the state information within internal data structures within the various processes executing in router 6A. Operating systems executing within the primary and standby control units manage the data structures and inform "consumers" of any change to the state information. Consumers may comprise software processes executing within components of router 6A, such as chassis management processes, configuration management processes, or other processes in router 6A. Additionally, consumers of the state information may comprise hardware components or combinations thereof, such as one or more forwarding engines, interface cards (IFCs), or other hardware.

Because the state information is maintained as described above, one of the standby control units may assume control of router 6A, and can deterministically identify the state information of which each consumer has already been informed, i.e., consumed. As a result, the standby control units may only need to update the consumers with limited amount of state information, and need not rely on relearning state information from the resources of router 6A.

At a point in time when a failover event occurs requiring a standby control unit to assume responsibility for operation of router 6A, the standby control unit verifies that all of its state information is in sync with all modifications made at the time of the failover. When the standby control unit determines that state information is not in sync because a modification to state information was not completed when the fail over event occurred, the standby control unit selectively replays state information with its interface components before control of router 6A begins. This selective replay of the out of sync state data is part of the standby control unit's operation at the beginning of all failovers.

Figure 2:
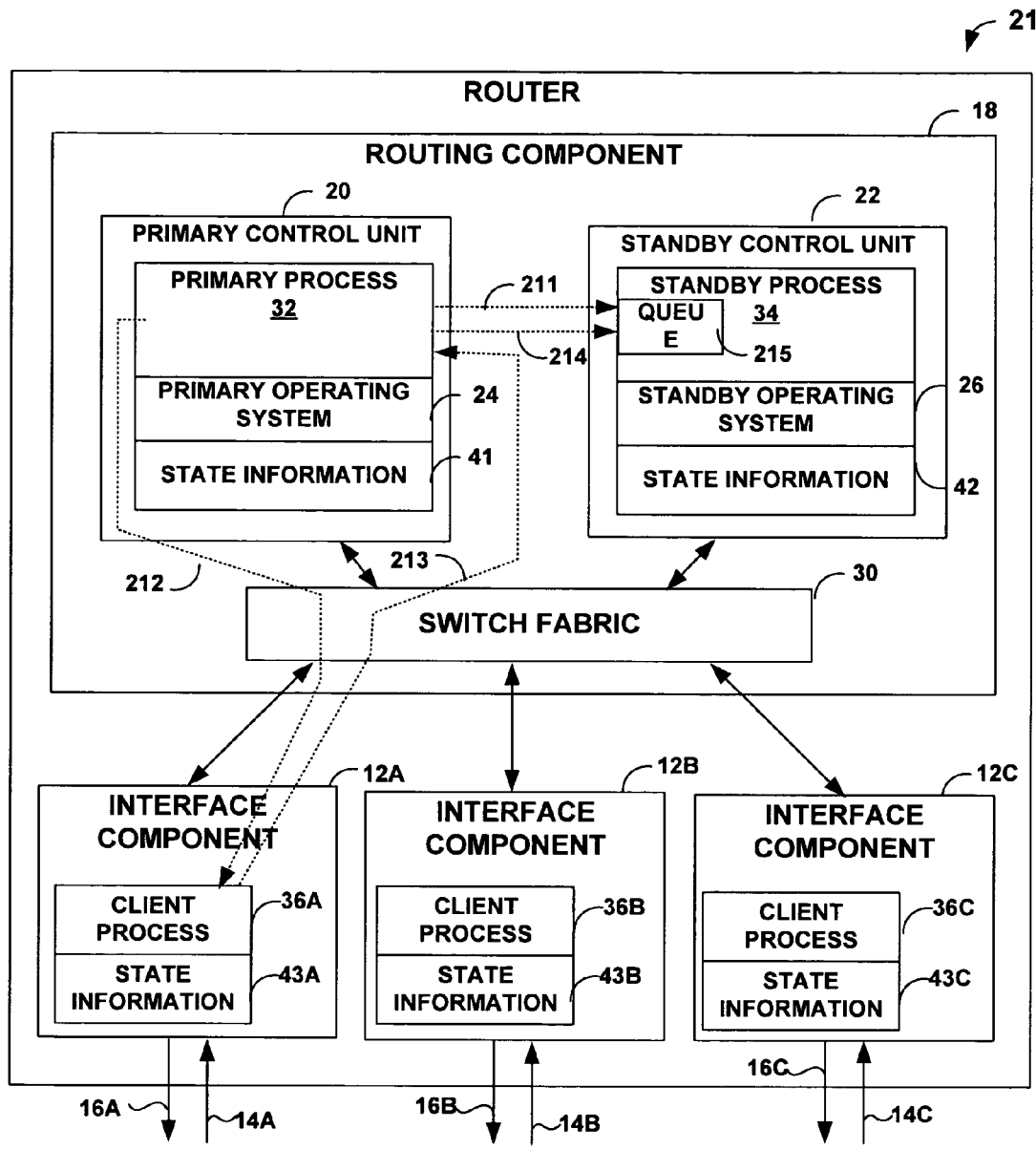
FIG. 2 illustrates an example embodiment of a router consistent with the principles of the invention.

FIG. 2 illustrates an example embodiment of a router consistent with the principles of the invention. In the exemplary embodiment, router 21 includes a plurality of interface components 12A-12C (hereinafter referred to as "interface components 12") for sending and receiving packets using network links 14A-14C (hereinafter referred to as "links 14") and 16A-16C (hereinafter referred to as "links 16"). Router 21 also includes a routing component 18 to receive inbound packets from network links 14 via the interface components 12, extracts information from the received packets and forwards the packets on network links 16 via the interface components based on the extracted information.

Routing component 18 includes primary control unit 20 and standby control unit 22. Primary control unit 20 and standby control unit 22 may be substantially similar in both hardware and software aspects. For example, both primary control unit 20 and standby control unit 22 may comprise similar combinations of programmable processors. Moreover, as illustrated in FIG. 2, both primary control unit 20 and standby control unit 22 may execute similar software processes, such as primary operating system 24, standby operating system 26, primary process 32, and standby process 34. Routing component 18 may also include a switch fabric 30 that is used to connect primary control unit 20, standby control unit 22, and interface components 12 in a manner permitting simultaneous transfer of data between various components. These connections may be constructed, for example, using virtual communications channels configured between various software processes within the components of the router 21. The virtual communication channels may be configured to operate through the switch fabric 30 that connects the various components within router 21. These connections and virtual communications channels are created, maintained, and operated as part of primary operating system 24 for use by primary process 32.

Primary operating system 24 executing on primary control unit 20 may provide a multi-tasking operating environment for execution of a number of software processes, such as primary process 32. In like manner, standby operating system 26 executing on standby control unit 22 may also provide a multi-tasking operating environment for execution of a number of similar software processes, such as standby process 34. An exemplary operating system capable of this is FreeBSD, which is an advanced UNIX operating system that is compatible with a number of programmable processors. Other multi-tasking operating systems may be used for primary operating system 24 and standby operating system 26.

Primary process 32 and standby process 34, respectively, may both include similar software processes, such as routing protocols daemons, device control daemons, user interface processes, chassis management daemons, and the like. In general, these software processes perform a number of tasks to ensure proper operation of router 21. For example, the routing protocols daemons may implement protocols for exchanging route information with other routing devices, and may perform route resolution to maintain routing information that reflects the topology of a network environment.

Both primary operating system 24 and standby operating system 26 maintain respective state information 41, 42 as state data associated with the operation of software processes 32 and 34, respectively, and their corresponding control of router 21. A portion of this state information 41, 42 may, for example, represent the current state of the interface between router 21 and the network, which may include the current configuration of interface components 12. State information 41, 42 may comprise internal data structures. As such, state information may be stored in memory, such as RAM, located on respective primary and standby control units 20, 22 or external to primary and standby control units 20, 22.

Interface components 12 may also maintain state information 43A-43C (hereinafter referred to as "state information 43") as state data. State information 43 may, for example, represent the current state of field replaceable units, such as interface cards, encryption cards, accounting service cards, and the like. Again, state information 43 may be stored in memory, such as RAM, located within or external to interface components 12. Interface components 12 maintain state information 43 using respective client processes 36A-36C (hereinafter referred to as "client process 36") as described herein.

While the embodiment of FIG. 2 illustrates a single primary process 32, a single standby process 34 and a single client process 36 in each of interface components 12, one skilled in the art will recognize that a plurality of primary processes, a plurality of corresponding standby processes and a plurality of corresponding client processes may be used to maintain state information 41-43. In such an alternate embodiment, a corresponding primary process 32 in primary control unit 20 is associated with a corresponding standby process 34 in the standby control unit 22. Each of these plurality of processes may control a respective subset of the entire state information 41-43 maintained and used in router 21. Moreover, FIG. 2 illustrates one embodiment in which state information 41-43 is illustrated as respective data blocks within primary control unit 20, standby control unit 22, and interface component 12 respectively. One skilled in the art will recognize that that state information 41-43 may be divided and separately maintained within the plurality of primary processes, the plurality of corresponding standby processes and the plurality of corresponding client processes, respectively, rather than the single blocks of data of FIG. 2 while operating according to principles of the present invention.

Because router 21 may possess a plurality of interface components 12, primary control unit 20, and its corresponding primary process 32, may perform a state data update process for each of the plurality of interface components. More specifically, each of the plurality of interface components 12 is treated as a separate component that possesses an independent set of state information 43. As such, primary control unit 20 separately maintains and updates state information 43A-43C within respective interface units 12A-12C. When primary control unit 20 synchronizes its state information 41 with standby control unit 22, the state information 43 for the individual processes on each of the plurality of interface components 12 is similarly maintained within state information 42 in standby control unit 22.

In general, primary control unit 20, standby control unit 22 and interface components 12 exchange messages to maintain and synchronize state information 41-43. In particular, the messages include a first state data update message 211, a second state data update message 212, first acknowledgement message 213, and a second acknowledgement message 214. Primary control unit 20 transmits first state date update message 211 to standby control unit 22 via the communications channel between the primary process and the standby process. Standby control unit 22 receives and stores first state data update message 211 within a pending message queue 215 for subsequent processing.

In addition, client process 36A receives and processes second state data update message 212 to update state information 43A. Once second state data update message 212 has been successfully processed, client process 36A generates and transmits first acknowledgement message 213 to primary operating system 24. Primary operating system 24 may provide first acknowledgement message 213 to primary process 32 to inform the primary process that state information 43A has been successfully updated. In addition, primary operating system 24 transmits second acknowledgement message 214, which may corresponds to a copy of first acknowledgement message 213, to standby process 34 to inform the standby process that second state data update message 212 has been successfully applied by the client process 36A. Second acknowledgement message 214 may also be inserted into the pending message queue 215 for subsequent processing.

Once standby control unit 22 receives both first state data update message 211 and its corresponding second acknowledgement message 214 in pending message queue 215, standby process 34 processes the first state data update message to update state information 42. The application of first state data update message 211 may not be immediately applied once standby control unit 22 stores both state data update message 211 and acknowledgement message 214 having the same unique operation ID in the pending message queue 215. Rather, particular state data update message 211 in pending message queue 215 may be applied by standby control unit 22 to state information 42 once all of the messages received and stored within the pending message queue 215 before the particular state data update message in question have been processed. The application of first state data update messages 211 in the order received ensured correct application of the desired state information updates. One skilled in the art will recognize that this application of the update messages in the order in which they are received may be applied in a global fashion for all update messages sent between primary control unit 20 and standby control units 22 as well as to messages in a process by process ordering without departing from the principles of the invention.

Standby control unit 22 processes the receipt of second acknowledgement message 214 to match the second acknowledgement message with the previously received first state data update message 211. In one embodiment, first state data update message 211, second state data update message 212, first acknowledgement message 213 and second acknowledgement message 214 include an identical unique operation identifier ("ID"), also referred to as a state change identifier. In other words, primary control unit 20 assigns unique operation IDs to identify all related operations for updating a respective change to state information 41 maintained by the primary control unit. Primary control unit 20 uses the same operation ID in all update messages that relate to the state information, including any messages sent to interface components 12 and standby control unit 22. This allows standby control unit 22 to match acknowledgement messages forwarded by primary control unit 20 with previously received state data update messages. Based on this matching, standby control unit 22 updates state information 42. In this manner, the use of the operation IDs allows secondary control unit 22 to deterministically identify which update messages have been processed by interface components 12, and allows primary control unit 20 to asynchronously update interface components 12. After being updated, state information 42 within standby control unit 22 is substantially similar to state information 41 maintained by primary control unit 20. In other words, state information 41 and 43 within the primary and standby control units 20 and 22, respectively, are synchronized.

Synchronization of state information 41 of primary control unit 20 and state information 42 of standby control unit 22 continues in this manner until a failover event occurs, i.e., when the standby control unit takes over functionality of router 21. In general, a failover event may be any condition or event within router 21, such as failure of primary control unit 20, that causes standby control unit 22 to assume responsibility for maintaining current state information within the router.

Once failover occurs, primary control unit 20 is unable to issue state change messages, and standby control unit 22 assumes control over resources, such as interface components 12. In the event failover occurs while primary control unit 20 is updating one or more resources, standby operating system 26 resumes updating the resources. In particular, standby operating system 26 uses the state data update messages and the acknowledgement messages within pending message queue 215 to identity any client processes 36 that are out-of-sync with state information 42. Standby operating system 26 then selectively replays portions of state information 42 to the identified client processes 36 of interface components 12. Standby control unit 22 then assumes the role of primary control unit 20. Primary control unit 20 may, after being reset, return to an operational status and assume the role of standby control unit 22. In this case, standby control unit 22 (operating as the primary control unit) initiates resumes the state synchronization process to synchronize state information 41 with state information 42 in the manner described above.

Each of primary control unit 20 and standby control unit 22 may operate according to executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. The functions of router 21 may be implemented by executing the instructions of the computer-readable medium with one or more processors, discrete hardware circuitry, firmware, software executing on a programmable processor, or combinations thereof.

Figure 3:
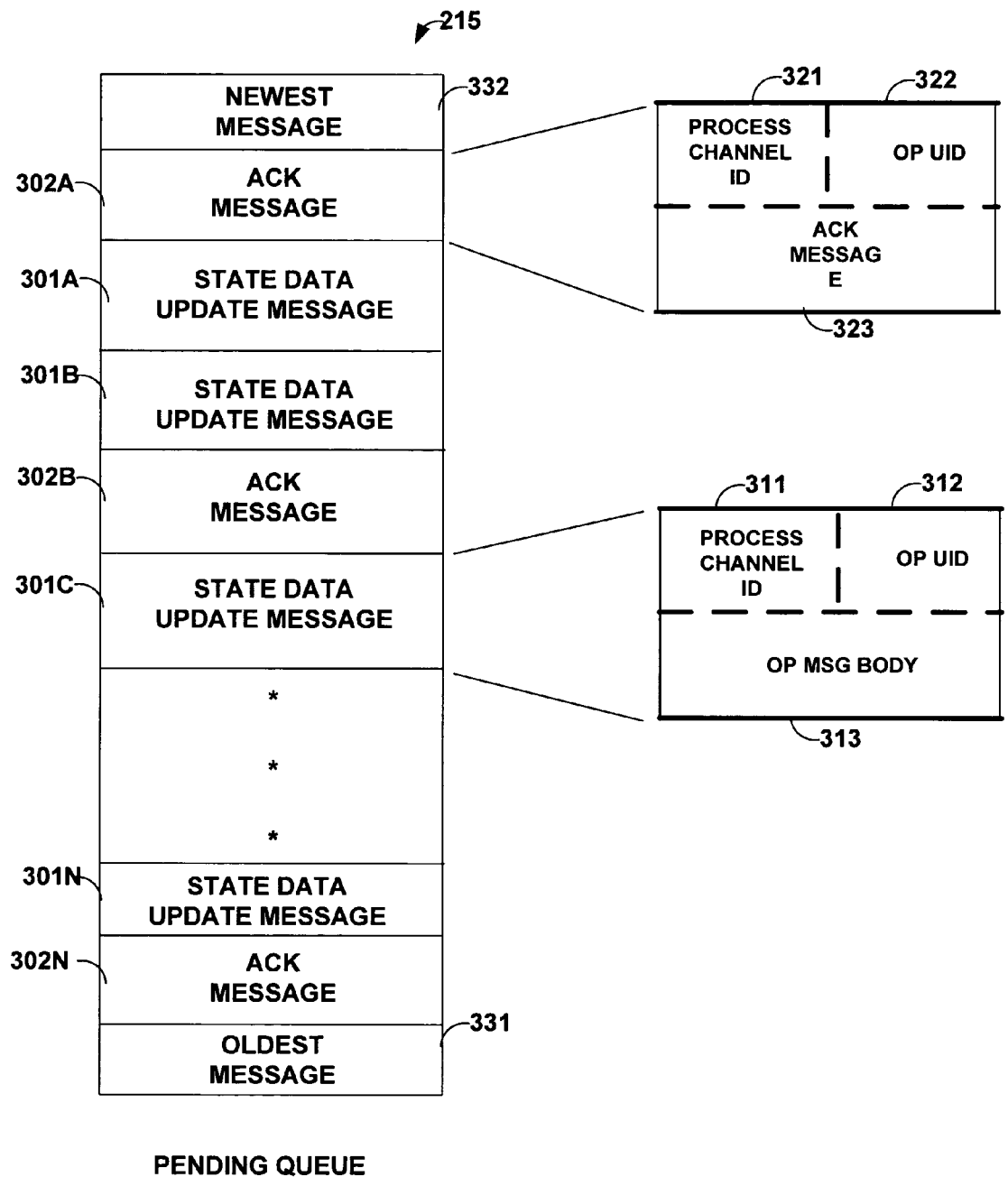
FIG. 3 is an example data structure for a pending message queue within a standby control unit operating as an exemplary embodiment of a router in accordance with the principles of the invention.

FIG. 3 is an example data structure of one embodiment of pending message queue 215 (FIG. 2) within standby control unit 22 of router 21. In this example, pending message queue 215 resides within standby control unit 22 and stores state data update messages 301A-301N (collectively, "state data update messages 301") and corresponding acknowledgement messages 302A-302N (collectively, "acknowledgement messages 302").

As illustrated in FIG. 3, each of state data update messages 301 may include a set of fields that identify an update operation being performed as well as the one of the client processes 36 from which the state data update message originated. In the illustrated example of FIG. 3, these fields include a process channel identification ("ID") field 311, an operation unique identifier (OP UID) 312, and the operation message body (OP MSG BODY) 313.

The process channel ID field 311 contains a data value that identifies the primary process/client process pair that a particular state data update message 301 is used to update. As discussed above, primary control unit 20 uses at least one independently executing primary process 32 to maintain the operation of router 21. Primary process 32 communicates with a corresponding client process 36 that may be present in any of the plurality of interface components in router 21. As such, a large number of communications channels may be used to transmit the update messages from a primary process to a client process. The data value within process channel ID field 311 identifies the particular virtual channel over which the particular one of state data update messages 301 was transmitted. As a result, process channel ID field 311 identifies the primary process 32 and the corresponding one of client processes 36 to which this update message is directed.

Unique operation ID 312 identifies a particular update operation associated with the respective one of state data update messages 301, and is used in conjunction with process channel ID field 311 to identify the corresponding one of acknowledgement messages 302. The operation message body 313 contains the remaining data used by standby process 34 and the receiving one of client processes 36 to perform the state information data update. The contents of operation message body 313 are typically defined by the process, e.g., primary process 32, that generated the particular state data update message 301 within primary control unit 20.

In the exemplary embodiment of FIG. 3, each of acknowledgement messages 302 contains three data fields: process channel ID field 321, a unique operation ID (OP UID) 322, and an acknowledgement message field (ACK MESSAGE) 323. Process channel ID field 321 and unique operation ID 322 are identical to the corresponding data fields within state data update messages 301. Acknowledgement message field 323 may be a field or a single bit that indicates that the message is an acknowledgement message as opposed to an update message. Acknowledgement messages 302 may generally be small in size to permit efficient transmission through router 21.

Client processes 36 are assumed to transmit respective acknowledgement messages 302 as state data update messages 301 are received and successfully processed to update state information data 43. In alternate embodiments, interface components 12 may send acknowledgement messages 302 infrequently. In this embodiment, acknowledgement messages 302 correspond to the last state data update message 301 that was successfully applied to state information 43 by each of client processes 36. If client processes 36 process multiple state data update messages 301 within a given acknowledgment message transmission time period, a single acknowledgement message 301 is sent by each of the client processes and includes the last of the unique operation IDs 312 for the processed state data update messages 301. Standby control unit 22 may process acknowledgement messages 302 in order based on unique operation IDs 312. This may reduce the number of acknowledgement messages 302 transmitted to and processed by standby control unit 22.

Figure 4:
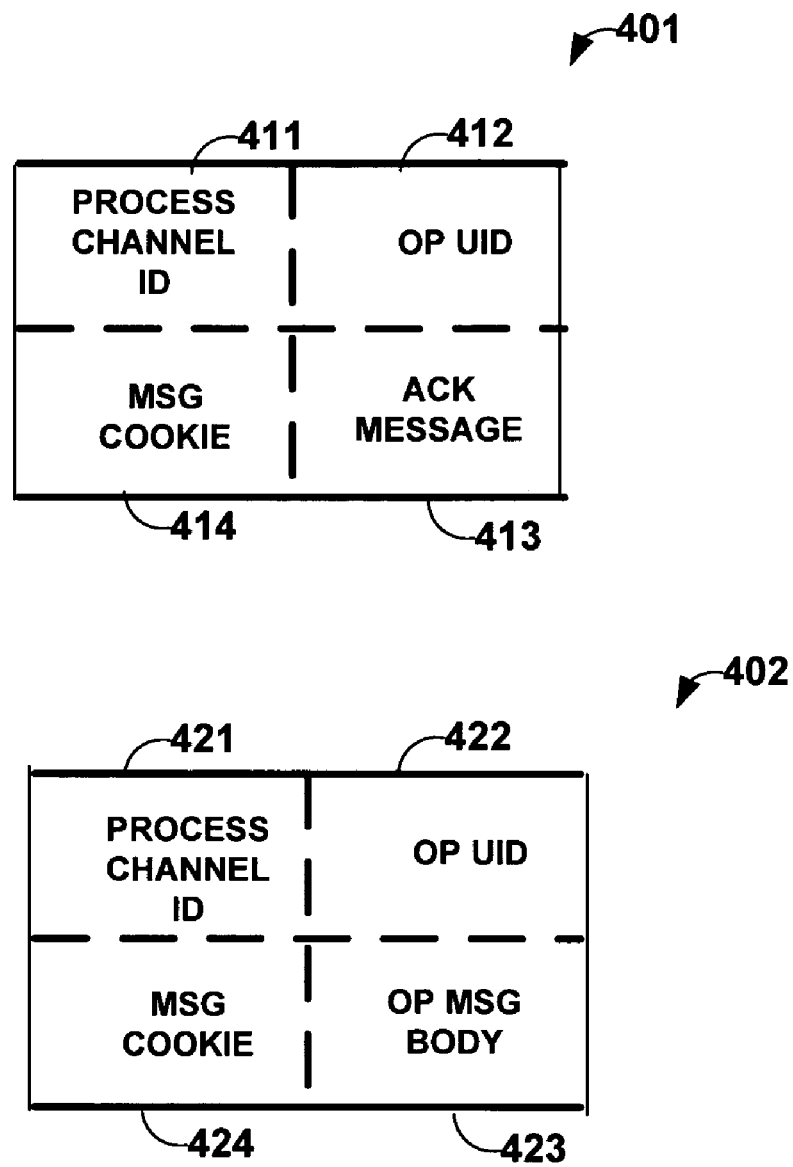
FIG. 4 is an example data structure for a state data update messages and corresponding acknowledgement message in accordance with the principles of the invention.

FIG. 4 illustrates other exemplary data structures for a state data update message 401 and corresponding acknowledgement messages 402 in accordance with the principles of the invention. In this illustrated embodiment, state data update message 401 and corresponding acknowledgement message 402, respectively, include message cookie data fields 414 and 424, respectively, in addition to fields 411-413 and 421-423 that substantially conform to the corresponding fields described above in reference to FIG. 3.

In this embodiment, primary process 32 uses message cookie data fields 414 and 424 to encode and communicate additional information related to the state information update operation. Primary process 32 may, for example, include certain additional information in message cookie data fields 414 and 424 that allows re-syncing the state information without a full replay of current state information 42 in standby control unit 22.

For example, message cookie fields 414 and 424 may contain eight (8) bits of data corresponding to a set of eight sections of state information 41 maintained by primary process 32. Moreover, standby control unit 22 may interpret a logical 1 in any of the 8 bits as indicating that the corresponding section of state information 41 was changed as a result of an update operation by this message. As such, standby operating system 26 need only selectively replay to interface components 12 those portions of state information 42 that are associated with the set data bits in a synchronization operation. Any number of data encoding mechanisms may be used to implement the message cookie data fields 414 and 412.

Figure 5:
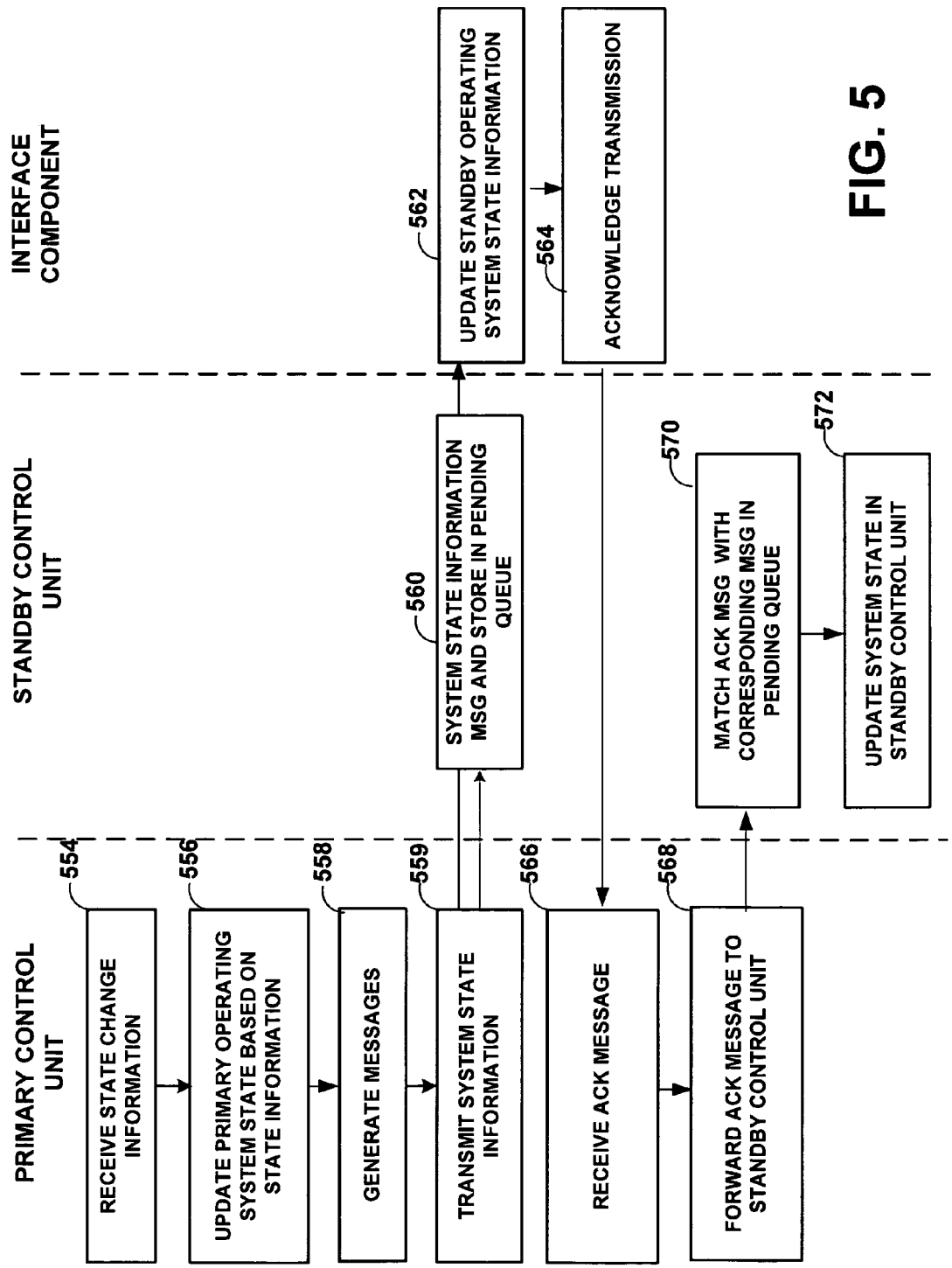
FIG. 5 is a flowchart illustrating exemplary operation of a router in accordance with the principles of the invention.

FIG. 5 is a flowchart illustrating exemplary operation of router 21 (FIG. 2) to synchronize and process state changes in accordance with the principles of the invention. The process for maintaining synchronization for state information 41-43 associated with processes running within router 21 is initiated when primary process 32 executing within primary control unit 20 receives a state change request (554). In response, primary control unit 20 identifies the portion of state information 41 to be changed as the one of client processes 36 that generated the request, e.g., client process 36A. Using the information contained within the state change information request, primary process 32 updates state information 41 associated with the identified client process 36A (in this example) (556).

Next, primary process 32 generates state data update messages 211, 213 for the originating client process 36A in the component and standby process 34 in standby control unit 22 (558). Primary process 32 generates both of these state data update messages 211, 212 to contain a common unique operation ID to identify these state data update messages as associated with the same state change request received and processed by primary control unit 20. Primary control unit 20 transmits the two state data update messages 211, 212 to their respective destinations (559).

Standby control unit 22 receives state data update messages 211, and stores the state data update message within pending message queue 215 for later use (560). Similarly, client processes 36A that initiated the update request receives and processes state data update message 212 to update its respective state information 43A (562). Once this state information update operation has successfully completed, client process 36A transmits acknowledgment message 213 from the interface component 12 to primary control unit 20 (564, 566). Acknowledgement message 213 is used to inform primary control unit 20 that the update operation was completed. In addition, acknowledgement message 213 contains the unique operation ID corresponding to the update message that generated the acknowledgement message.

Primary control unit 20 may inform primary process 32 of acknowledgement message 213 to permit primary process 32 to complete any housekeeping operations that are part of the update process. Primary control unit 20 also forwards the acknowledgement message 214 to standby control unit 22 to complete the update process within standby control unit 22 (568).

Upon receipt of the forwarded acknowledgement message 214, standby control unit 22 matches the acknowledgement message with its corresponding state data update message 211 by locating the state data update message within pending message queue 215 that contains the same unique operation ID (570). Standby control unit 22 may now update state information 42 for the appropriate standby process 34 based upon data within state data update message 211 because both primary control unit 20 and client process 36A have successfully completed the update operations (572). Router 21 applies these techniques to keep system state information 41-43 within primary control unit 20, standby control unit 22, and interface components 12 synchronized.

Figure 6:
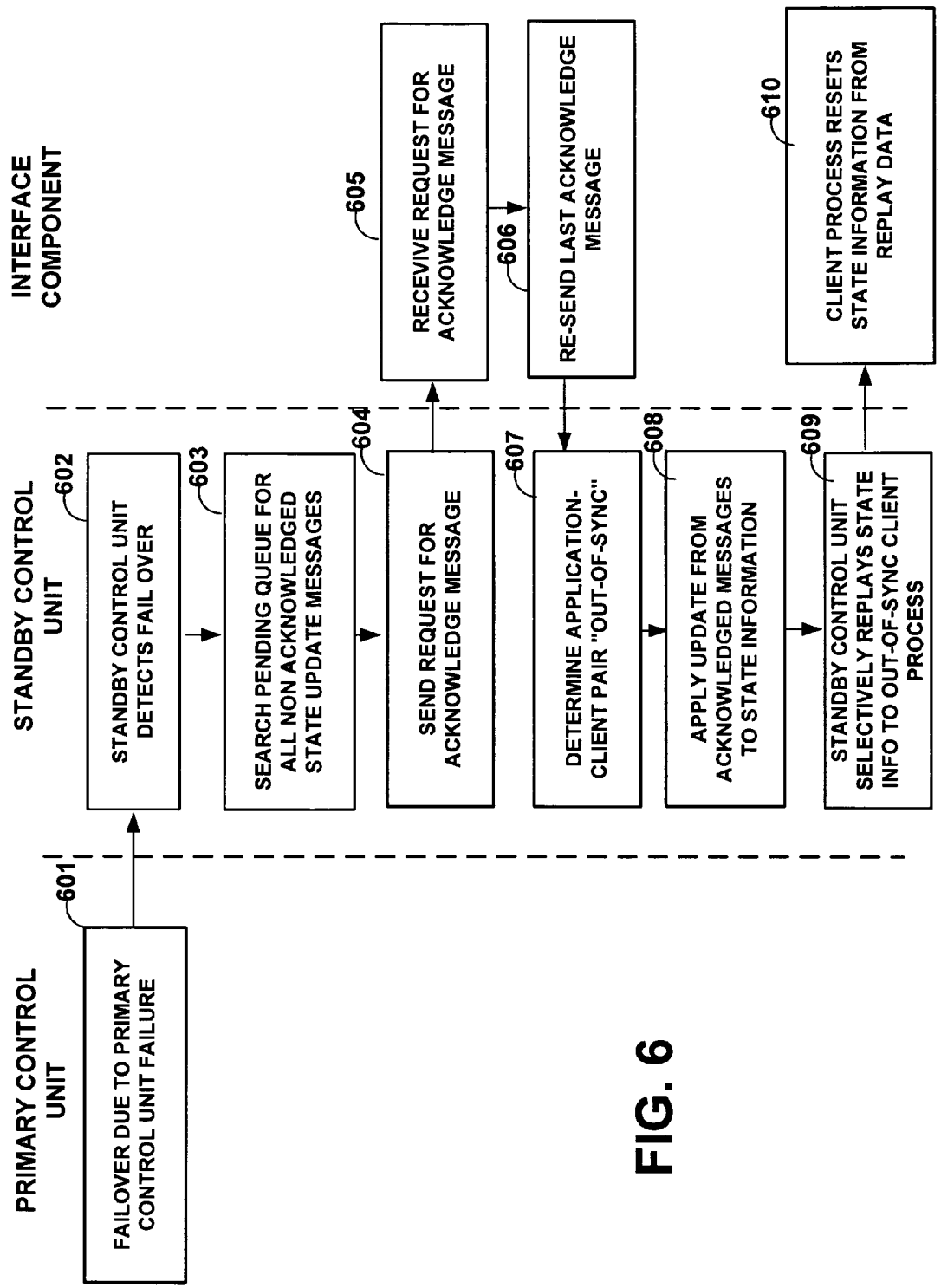
FIG. 6 is a flowchart illustrating exemplary operation of a router during a failover operation in accordance with the principles of the invention.

FIG. 6 is a flowchart illustrating exemplary operation of router 21 (FIG. 2) during a failover event in accordance with the principles of the invention. At a point in time when the failover event occurs (601), control of processing within router 21 passes from primary control unit 20 to standby control unit 22.

In general, standby control unit 22 may perform two classes of operations before it assumes complete control of router 21 upon detecting a failover event (602). First, standby control unit 22 determines if standby process 34 is in a state that permits continued operation. Second, standby control unit 22 determines whether state information 42 is current with respect to state information 43 maintained by other components, e.g., interface components 12, of router 21.

Maintaining and updating state information 42, as discussed above, involves transmitting state data update messages between primary control unit 20, standby control unit 22, and interface components 12 to ensure that state information stored therein reflects the desired state of the system and its processes. Because of delays in processing the state data update messages, standby control unit 22 cannot ensure with certainty that the state information therein remains synchronized for all client processes 36 at the exact point in time when a failure event occurs. As such, standby control unit 22 first determines whether standby process 32 maintains current state information 42 that is synchronized with state information in the corresponding client process 36.

Initially, standby control unit 22 searches pending message queue 215 to identify all state data update messages within the pending message queue that have not received a corresponding acknowledgement messages (603). This condition may arise, for example, because client processes 36 within interface components 12 have successfully completed update operations, but the corresponding acknowledgement messages were lost in the failover. In addition, this condition may arise because one or more of client processes 36 have not received and processed state data update messages that correspond to state data update messages found in pending message queue 215.

In response to finding a state data update message without a corresponding acknowledgement message, standby control unit 22 may send a request (604) to one of client processes 36 (client process 36A for example) to identify the out-of-sync client process and request retransmission of the last transmitted acknowledgement message.

When one of interface components 12 has not received and processed a state data update message found in pending queue 215, standby control unit 12 receives no response to its request and may choose to merely delete the state data update message. In particular, state information 43 is already synchronized state information 42 of standby control unit 22 because no update operation has been applied to either form of state information. Alternatively, standby control unit 22 may elect to examine the data within the pending state data update message to determine whether enough information is present to selectively resend, or replay, the message.

Where client process 36A has processed the state change and is indeed out of synchronization with standby control unit 22, client process 36A, in this example, receives the request message (605), and transmits a response to provide the standby control unit 22 with the identity of the last successfully processed state data update message (606). As described above, the state data update messages and corresponding acknowledgement messages may contain unique operation IDs that increase sequentially. Consequently, receipt of a substitute acknowledgement message having a unique operation ID of N informs standby control unit 22 that all state data update messages having a unique operation ID less than or equal to N have been successfully processed, and that all state data update messages having a unique operation ID greater than N within the pending message queue have not been processed (607). Using this information, standby control unit 22 may mark all of the appropriate state information update operation messages within a pending message queue as having been successfully completed by one of interface components 12. These successfully completed operation messages within the pending queue may be applied to the state information maintained by the standby control unit (608) to attempt to re-sync the state information within the system.

Upon receiving the response, standby control unit 22 selectively replays current state information 42 associated with the one or more of client process 36 that are out-of-sync in order (609) to reset their respective state information 43 to a condition that matches the current version of state information 42 (610).

For example, standby control unit 22 decides which pending updates to apply to state information 42 and 43 and which to discard. In one embodiment, standby control unit 22 applies a given state data update message only if state data update messages having all lower operation identifiers are also applied, causing only "trailing" updates to be discarded. This technique may ensure that state data update messages are applied consistently in accordance with their order of generation. Standby control unit 22 may selects a point within pending message queue 215 where all earlier updates may be applied and all later ones may be discarded. Selection of a point nearer the tail of pending message queue 215 may result in a more complete fail-over, because fewer updates will be discarded. Conversely, picking a point nearer the head of pending message queue 215 may result in a faster recovery. Standby control unit 22 may dynamically determine, e.g., based on a weighting function or other criteria, an appropriate balance between recovery speed and completeness. Once standby process 34 and client process 36 are synchronized, standby control unit 22 may begin receiving requests to update state information 42 a normal operation commences.

In another embodiment, standby control unit 22 retrieves a last acknowledged operation ID from client process 36 that identifies the last update operation successfully processed by client process 36. Using this retrieved last acknowledged operation ID and the contents of pending message queue 215, standby control unit 22 processes the contents of the pending message queue to determine which, if any, of client processes 36 have state information 42 that is out of sync.

Because selectively replaying state information data is only performed for those client process 36 pairs that are not in sync with state information 42, it may be necessary to re-sync only a few of the many client processes within router 21. For example, state information 43 corresponding to client process 36 may change infrequently. In some environments, the re-synchronization process described herein may result in significant replay of state information 42 to synchronize a particular one of client process 36; however, the small number of such client processes requiring re-synchronization may permit significant improvement in performance of router 21.

Various embodiments of the invention have been described. Although described in reference to a router, the techniques may be applied to any device having a plurality of control units. Examples of other devices include switches, gateways, intelligent hubs, firewalls, workstations, file servers, database servers, and computing devices generally, Moreover, although the techniques have been described as elements embodied within a single device, the described elements may be distributed to multiple devices. The term "system" is used herein to generally refer to embodiments of the invention in which the described elements may be embodied within a single network device or distributed within multiple devices. These and other embodiments are within the scope of the following claims.

What is claimed is:

1. A method comprising:
   storing state data update messages and corresponding acknowledgement messages in a standby control unit of a network device, wherein each of the state data update messages and the respective one of the acknowledgement messages includes a corresponding state change identifier; and
   upon an occurrence of a failover event, selectively replaying state information to an interface component of the network device from the standby control unit based upon the state change identifiers of the stored state data update messages and acknowledgement messages, wherein selectively replaying state information comprises:
     identifying a standby process within the standby control unit containing current state information that is not synchronized with state information of a corresponding client process within the interface component by;
       identifying a set of second state data update messages stored by the standby control unit that are not associated with corresponding acknowledgement messages;
       requesting retransmission of the acknowledgement messages by the interface component to identify acknowledgement messages lost as a result of the failover event; and
       identifying the standby process based on one or more of the set of second state data update messages that remain unassociated with corresponding acknowledgement messages after the requested retransmission; and
     transmitting current state information maintained by the standby process to the corresponding client process within the interface component to re-synchronize the state information of the client process and the state information of the standby process.

2. The method according to claim 1, wherein the state data update messages, the acknowledgement messages, and the current state information transmitted by the standby process are transmitted using a unique virtual communication channel between the standby process and the corresponding client process.

3. The method according to claim 1, wherein each of the state data update messages and each of the acknowledgement messages comprise a cookie data field permitting the standby process to encode additional data used to reduce the current state information required to re-synchronize the state information of the client process.

4. The method according to claim 1, wherein the standby control unit maintains the current state information associated with the standby process following selected replay of state information.

5. The method according to claim 1, wherein the standby control unit comprises only one standby process.

6. The method according to claim 1, wherein the standby control unit comprises at least two standby processes.

7. A method comprising:
   communicating a first state data update message from a primary control unit to an interface component and a second state data update message to a standby control unit to update state information within the interface component and the standby control unit, the first and second state data update messages having a common unique operation identifier (ID);
   communicating an acknowledgement message from the interface component to the standby control unit to indicate the successful processing of the first state data update message, the acknowledgement message having the unique operation ID;
   upon receipt of both the second state data update message and the acknowledgement message, processing the second state data update message in the standby control unit; and
   upon an occurrence of a failover event, selectively replaying state information from the standby control unit to the interface component when the second state data update message was received without a corresponding acknowledgement message, wherein selectively replaying state information comprises:
     identifying a standby process within the standby control unit containing current state information that is not synchronized with a corresponding client process in the interface component using the second state data message and the acknowledgement message stored within the pending message queue by:
       identifying any second state data update message within the pending message queue not possessing a corresponding acknowledgement message;
       requesting retransmission of the acknowledgement messages by the interface component to identify acknowledgement messages lost as a result of the failover event; and
       identifying the standby process based on one or more of the second state data update messages that remain unassociated with corresponding acknowledgement messages after the requested retransmission; and
     transmitting current state information maintained by the standby process to the corresponding client process within the interface component to re-synchronize the current state information in the standby process and the state information in the corresponding client process.

8. The method according to claim 7, wherein communicating an acknowledgement message comprises:
communicating the acknowledgement message from the interface component to the primary control unit; and
forwarding the acknowledgement message from the primary control unit to the standby control unit.

9. The method according to claim 7, wherein communicating an acknowledgement message comprises communicating the acknowledgement message from the interface component directly to the standby control unit.

10. The method according to claim 7, wherein the second state data update message contains state information for use in updating the state information maintained within the standby control unit.

11. The method according to claim 10, wherein the first state data update message contains at least a subset of the state information contained within the second state data update message.

12. The method according to claim 7, wherein the standby control unit stores the second state data update message and the acknowledgement message in a pending message queue.

13. The method according to claim 7, wherein each of the first state data update message, each of the second state data update message, each of the acknowledgement message, and current state information transmitted to re-synchronize state information of the client process are transmitted using a unique virtual communication channel between the standby process and the corresponding client process.

14. The method according to claim 7, wherein the first state data update message, the second state data update message, and the acknowledgement message comprise a cookie data field permitting the standby process to encode additional data used to minimize the current state information required to re-synchronize state information with the client process.

15. The method according to claim 12, wherein older messages stored within the pending message queue are processed differently than newer messages stored within the pending message queue following the occurrence of the failover event to dynamically re-synchronize state information.

16. The method according to claim 7, wherein the primary control unit, standby control unit, and interface component collectively perform the functions of a network data router.

17. The method according to claim 7, wherein the standby control unit maintains the state information maintained within the standby process following selected replay of state information.

18. A system comprising:
means for communicating a first state data update message from a primary control unit to an interface component and a second state data update message to a standby control unit, the first and second state data update messages having a unique operation ID;
means for communicating an acknowledgement message from the interface component to the standby control unit to indicate the successful processing of the first state data update message, the acknowledgement message having the unique operation ID;
means for processing the second state data update message upon receipt of both the second state data update message and the acknowledgement message having identical unique operation ID; and means for selectively replaying state information to the interface component when the second state data update message was received without a corresponding acknowledgement message upon an occurrence of a failover event, the means for selectively replaying the state information data comprising:
(a) means for identifying the standby process within the standby control unit containing current state information not synchronized with state information in the interface component using the state data update message stored within the pending message queue, the means for identifying the standby process comprising:
(i) means for identifying any second state data update messages within the pending message queue not possessing a corresponding acknowledgement message;
(ii) means for requesting retransmission of the acknowledgement messages by the interface component to identify acknowledgement messages lost as a result of the failover event; and
(iii) means for identifying the standby process based on one or more of the set of second state data update messages that remain unassociated with corresponding acknowledgement messages after the requested retransmission;
(b) means for informing the standby process of the out-of-sync condition; and
(c) means for transmitting current state information data from by the standby process to a corresponding client process within the interface component to re-synchronize the state information in the interface component,
wherein the standby control unit stores the second state data update message and the acknowledgement message in a pending message queue.

19. The system according to claim 18, wherein the first state data update message, the second state data update message, and the acknowledgement message comprise a cookie data field permitting control unit standby process to encode additional data used to reduce the state information required to re-synchronize state information in the standby control unit with state information in the interface component.

20. A computer-readable medium comprising encoded instructions for causing a standby control unit to:
receive an acknowledgement message received from an interface component forwarded by a primary control unit to the standby control unit to indicate the successful processing of a first state data update message received by the interface component from the primary control unit, the first state data update message and the acknowledgement message having the common unique operation ID;
receive a second state data update message to the standby control unit, the second state data update message having a unique operation ID;
process the second state data update message within the standby control unit to update current state information upon receipt of both the second state data update message and the acknowledgement message;
selectively replay the current state information data to the interface component when the second state data update message was received without a corresponding acknowledgement message upon an occurrence of a failover event;
identify a standby process containing current state information not synchronized with state information in the interface component by (i) identifying the second state data update message within the pending, message queue not possessing a corresponding acknowledgement message, (ii) requesting retransmission of the acknowledgement message to identify any missing acknowledgement messages lost as a result of the failover event, and (iii) identifying unacknowledged second state data update messages as corresponding to the client process containing out-of-sync state information; and transmit the current state information maintained by the standby process to a corresponding client process within the interface component to re-synchronized the state information.

21. The computer readable medium according to claim 20, wherein the second state data update message and the acknowledgement message are stored in a pending message queue.

22. The computer-readable medium according to claim 20, wherein the second state data update message and the acknowledgement message are transmitted using a unique virtual communication channel between the standby process and the corresponding client process.

23. The computer-readable medium according to claim 20, wherein the first state data update message, the second state data update message, and the acknowledgement message comprise a cookie data field permitting the primary control unit to encode additional data used to reduce the current state information required to re-synchronize state information between the standby control unit and the interface component following the failover event.

24. The computer-readable medium according to claim 20, wherein the standby control unit and the interface component collectively perform functions of a network data router when the standby control unit assumes responsibility for maintaining the current state information following the selected replay of state information.

* * * * *

UNITED STATES PATENT AND TRADEMARK OFFICE
CERTIFICATE OF CORRECTION

PATENT NO. : 7,376,078 B1  Page 1 of 1
APPLICATION NO. : 10/807823
DATED : May 20, 2008
INVENTOR(S) : Amicangioli et al.

It is certified that error appears in the above-identified patent and that said Letters Patent is hereby corrected as shown below:

Title page, Inventor Name (12), "Amiocangioli" should read -- Amicangioli --

Title page, Title (54), "SELECTIVE REPLAY OF A STATE INFORMATION WITHIN A COMPUTING DEVICE" should read -- SELECTIVE REPLAY OF STATE INFORMATION WITHIN A COMPUTING DEVICE --

Column 1, line 1, "SELECTIVE REPLAY OF A STATE" should read -- SELECTIVE REPLAY OF STATE --

Signed and Sealed this

Twenty-third Day of November, 2010

David J. Kappos
*Director of the United States Patent and Trademark Office*